United States Patent
Grundhofer et al.

(10) Patent No.: US 10,057,556 B2
(45) Date of Patent: Aug. 21, 2018

(54) PROJECTOR OPTIMIZATION METHOD AND SYSTEM

(71) Applicant: Disney Enterprises, Inc., Burbank, CA (US)

(72) Inventors: Anselm Grundhofer, Greifensee (CH); Simon Lukas Willi, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 204 days.

(21) Appl. No.: 15/008,735

(22) Filed: Jan. 28, 2016

(65) Prior Publication Data
US 2017/0223322 A1  Aug. 3, 2017

(51) Int. Cl.
*G03B 21/14* (2006.01)
*H04N 9/31* (2006.01)

(52) U.S. Cl.
CPC ......... *H04N 9/3191* (2013.01); *H04N 9/3129* (2013.01); *H04N 9/3182* (2013.01); *H04N 9/3185* (2013.01); *H04N 9/3194* (2013.01); *G03B 21/147* (2013.01); *H04N 9/3135* (2013.01)

(58) Field of Classification Search
CPC .... G03B 21/147; G03B 21/142; G03B 21/14; G03B 21/00; H04N 9/3185; H04N 9/3179; H04N 9/3194; H04N 9/317; H04N 9/3129; H04N 9/3135
USPC ............................................ 353/69, 70, 121
See application file for complete search history.

(56) References Cited

U.S. PATENT DOCUMENTS

| | | | |
|---|---|---|---|
| 6,292,171 B1* | 9/2001 | Fu | G06F 3/0386 345/156 |
| 8,766,998 B1 | 7/2014 | Morgan, III et al. | |
| 2005/0052618 A1 | 3/2005 | Ulichney et al. | |
| 2008/0062164 A1 | 3/2008 | Bassi et al. | |
| 2010/0245684 A1 | 9/2010 | Xiao et al. | |
| 2014/0092369 A1* | 4/2014 | Seno | G03B 21/2033 353/69 |

(Continued)

FOREIGN PATENT DOCUMENTS

| | | |
|---|---|---|
| CN | 101136192 A | 3/2008 |
| EP | 1385335 A1 | 1/2004 |

OTHER PUBLICATIONS

Abderyim, et al., "Accurate and Efficient Drawing Method for Laser Projection", The Journal of the Society for Art and Science 7(4):155-169, 2008, 15 Pages.

(Continued)

*Primary Examiner* — Ryan Howard
(74) *Attorney, Agent, or Firm* — Dorsey & Whitney LLP

(57) ABSTRACT

The present disclosure relates to a method and system for optimizing a projector for projection of content. In one embodiment the method includes receiving by a processing element a plurality of test images corresponding to test patterns projected by the projector on a projection surface, where each of the test patterns include at least two points, comparing by the processing element the plurality of test images to assess one or more projector characteristics related to a distance between the two points, generating by the processing element a projector model representing the one or more projector characteristics, and utilizing the model to determine a projection path of the projector for the content.

19 Claims, 10 Drawing Sheets

(56) References Cited

U.S. PATENT DOCUMENTS

2014/0320827 A1* 10/2014 Grundhofer ......... H04N 9/3182
353/69

OTHER PUBLICATIONS

Bradley, et al., "Adaptive Thresholding Using the Integral Image", J. Graphics Tools, 12(2):13-21, 2007, 11 Pages.

Damberg, et al., "High Brightness HDR Projection Using Dynamic Phase Modulation", ACM SIGGRAPH 2015 Emerging Technologies, pp. 13:1-13:1, Aug. 9, 2015, 1 Page.

Donato, et al., "Approximate Thin Plate Spline Mappings", In Proc. of the 7th European Conference on Computer Vision, ECCV '02, LNCS 2352, pp. 21-31, 2002, 11 Pages.

Garcia, et al., "Geometric Calibration for a Multi-Camera-Projector System", In Applications of Computer Vision (WACV), 2013 IEEE Workshop on, pp. 467-474, 2013, 13 Pages.

Halabi, et al., "Efficient Vector-Oriented Graphic Drawing Method for Laser-Scanned Display", Displays, 30(3):97-106, doi:10.1016/j.displa.2009.03.003, 2009, 10 Pages.

Kirkpatrick, et al., "Optimization by Simulated Annealing", Science, 220(4598):671-680, May 13, 1983, 10 Pages.

Lin, et al., "An Effective Heuristic Algorithm for the Traveling-Salesman Problem.", Operations Research, 21(2):pp. 498-516, 1973, 19 Pages.

Lin, "Computer Solutions of the Traveling Salesman Problem", Bell System Technical Journal, 44(10):2245-2269, 1965, 25 Pages.

Manakov, et al., "A Mathematical Model and Calibration Procedure for Galvanometric Laser Scanning Systems", In P. Eisert, J. Hornegger, and K. Polthier, editors, 16th International Workshop on Vision, Modeling and Visualization, pp. 207-214, Berlin, Germany, Oct. 4, 2011, 14 Pages.

Muja, et al., "Fast Approximate Nearest Neighbors with Automatic Algorithm Configuration", In Proceedings of the Fourth International Conference on Computer Vision Theory and Applications, pp. 331-340, VISAPP 2009, DOI: 10.5220/0001787803310340, 2009, 10 Pages.

Pangolin Laser Systems, "Lasershow Converter Max—Overview", http://www.pangolin.com/LD2000/lc-max_overview.htm [Retrieved from the Internet on Oct. 13, 2016], Last Online Update Sep. 29, 2009, 3 Pages.

Pangolin Laser Systems, "LD2000 Software Development Kit", http://www.pangolin.com/LD2000/LD2000_sdk.htm [Retrieved from the Internet on Oct. 13, 2016], Last Online Update Jun. 25, 2009, 2 Pages.

* cited by examiner

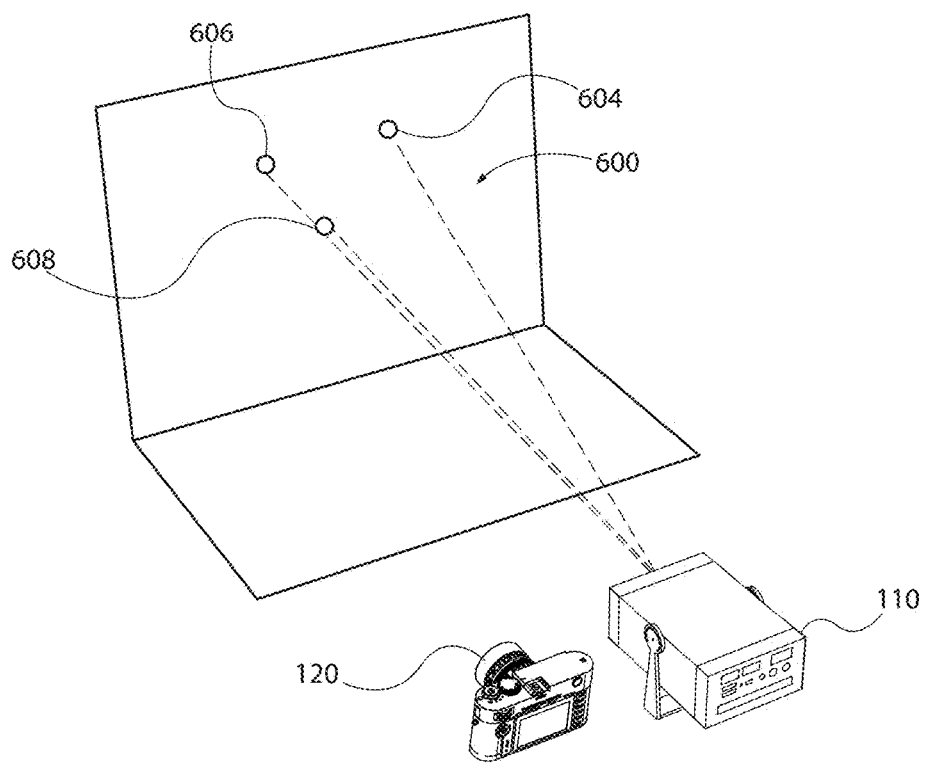
FIG. 6A
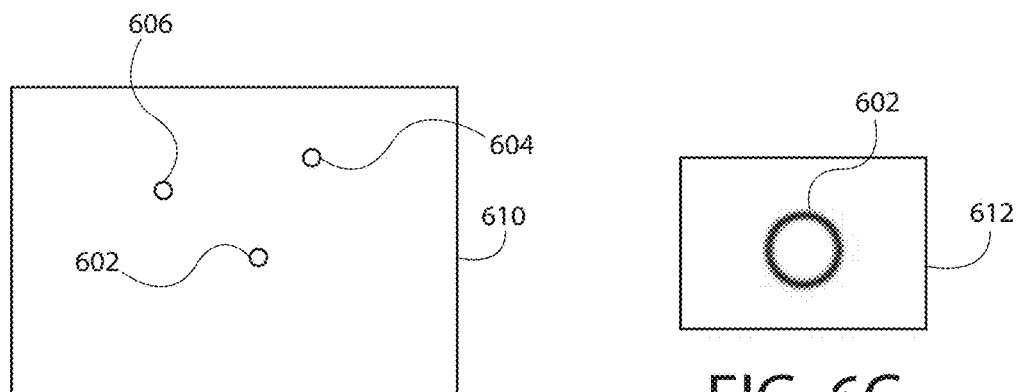
FIG. 6B
FIG. 6C

PROJECTOR OPTIMIZATION METHOD AND SYSTEM

TECHNICAL FIELD

The technology described herein relates generally to methods and systems for optimizing one or more projectors.

BACKGROUND

Image projectors are used to project images onto a projection surface, such as a screen. In some applications, video projectors are used to enhance, compliment, or otherwise augment objects on the surface to create a dynamic and enjoyable user experience, such as an amusement park attraction. For example, characters or objects may be projected on a surface that virtually "interact" with real objects on the surface.

Conventional video projectors have a number of limitations. In particular, conventional video projectors have limited color gamut and brightness. Due to these limitations, presentations using only conventional video projectors can appear dull and flat. Further, in situations where ambient lighting is present, the resulting image can appear washed out and unrealistic. On the contrary, laser projectors, such as laser scanning projectors, have increased brightness and color gamut as compared to conventional video projectors. In particular, laser projectors can project pure saturated, i.e. monochromatic red, green, and blue color tones, allowing a significantly wider color gamut than conventional video projectors.

In contrast to video projectors, laser projectors use galvanoscopic mirrors to steer the light. These mirrors are moved at such a high speed that, due to the limitations of human visual perception, the projected laser spots are perceived as static graphics by human observers. However, the speed of this mechanical mirror movement has physical limitations that can lead to issues such as blurring, flickering, and inertia. Therefore, scanning lasers are typically limited in the number of vertices that are properly displayed since visual flickering can occur quickly if the path is traced too slowly. On the other hand, the speed has to be reduced to ensure a precise spatial rendering of the content. Additionally, typical laser projectors will select a random path for rendering content. These issues contribute to flickering and other artifacts that affect the appearance of the projected content by laser projectors.

SUMMARY

One example of the present disclosure relates to a method and system for optimizing a projector for projection of content. In one embodiment the method includes receiving by a processing element a plurality of test images corresponding to test patterns projected by the projector on a projection surface, where each of the test patterns include at least two points, comparing by the processing element the plurality of test images to assess one or more projector characteristics related to a distance between the two points, generating by the processing element a projector model representing the one or more projector characteristics, and utilizing the model to determine a projection path of the projector for the content.

Another example of the present disclosure includes a method for generating a projector model for optimizing a projection path for projecting content by a projector. The method includes capturing by a camera multiple pattern images of test patterns projected by the projector, analyzing the pattern images to determine a distance characteristic and an angularity characteristic for reach test pattern in each of the pattern images, and creating a model database representing the projector based on the distance characteristic and the angularity characteristic of each test pattern.

Yet another example of the present disclosure includes a system for optimizing a projection path for content. The system includes a laser projector for projecting the content and a computer electronically connected to the laser projector. The computer includes memory including a projector model database corresponding to a displaying behavior of the projector and is configured to analyze the projector model to determine a minimized length of the projection path for the content and determine an optimal angularity between each point of the content along the projection path.

BRIEF DESCRIPTION OF THE DRAWINGS

FIG. 6A is a perspective view of the optimization system with the projector projecting a test pattern on a projection surface.

FIG. 6B is an illustration of a pattern image captured corresponding to the test pattern of FIG. 6A.

FIG. 6C is an illustration of the pattern image of FIG. 6B cropped around a central point.

SPECIFICATION

The present disclosure is generally related to optimizing a projection path for a scanning laser projector. With scanning laser projectors, the appearance of flickering is influenced by a variety of factors, such as overall scanning path length of the projector, order of path traversal, number of vertices to display, and temporal path consistency. The disclosed system and method minimizes these factors, while also maximizing the number of displayable points.

In one embodiment, the method includes capturing information of the scanning behavior of a laser projector under various path traces. Using this information, a model is generated that describes the behavior of the laser with respect to the relevant properties. This model is used to calculate an approximated optimal scanning path for one or more images that is a spatially accurate projection of the input points within a minimal amount of time and also minimizes the perceived flickering artifacts considering the spatio-temporal path distribution.

The term "laser projector" or "projector 110" as used herein is meant to refer to substantially any type of light projecting component, such as, but not limited to, a galvanoscopic laser scanning projector. Additionally, the method and system presented herein can be used to optimized other types or projectors without a guaranteed output based on the same input (e.g., an input having the same set of points displayed in the same locations, but in a different order), such as scanning projectors or other projectors having moving elements.

Figure 1A:
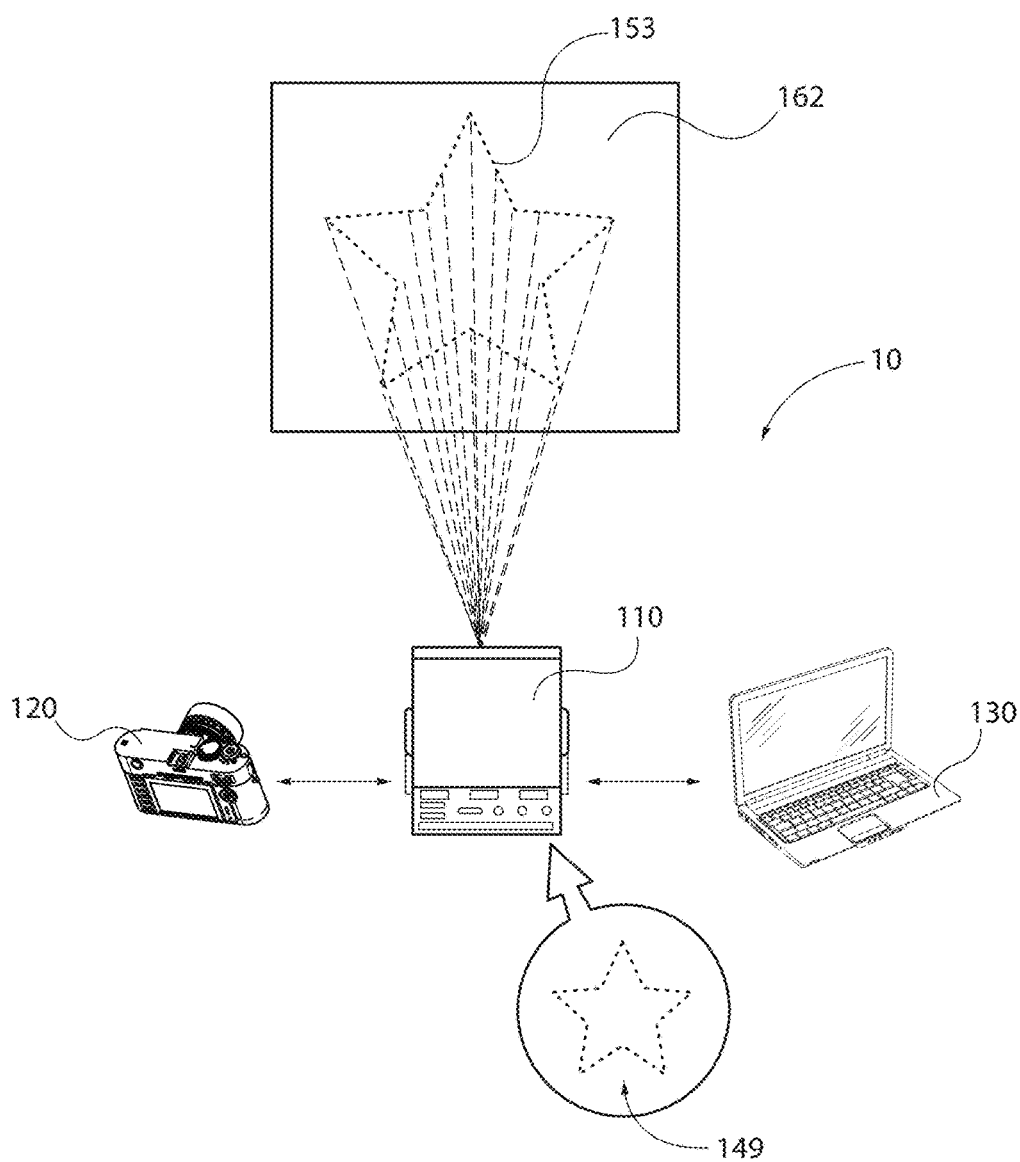
FIG. 1A is a perspective view of optimization system.
Figure 1B:
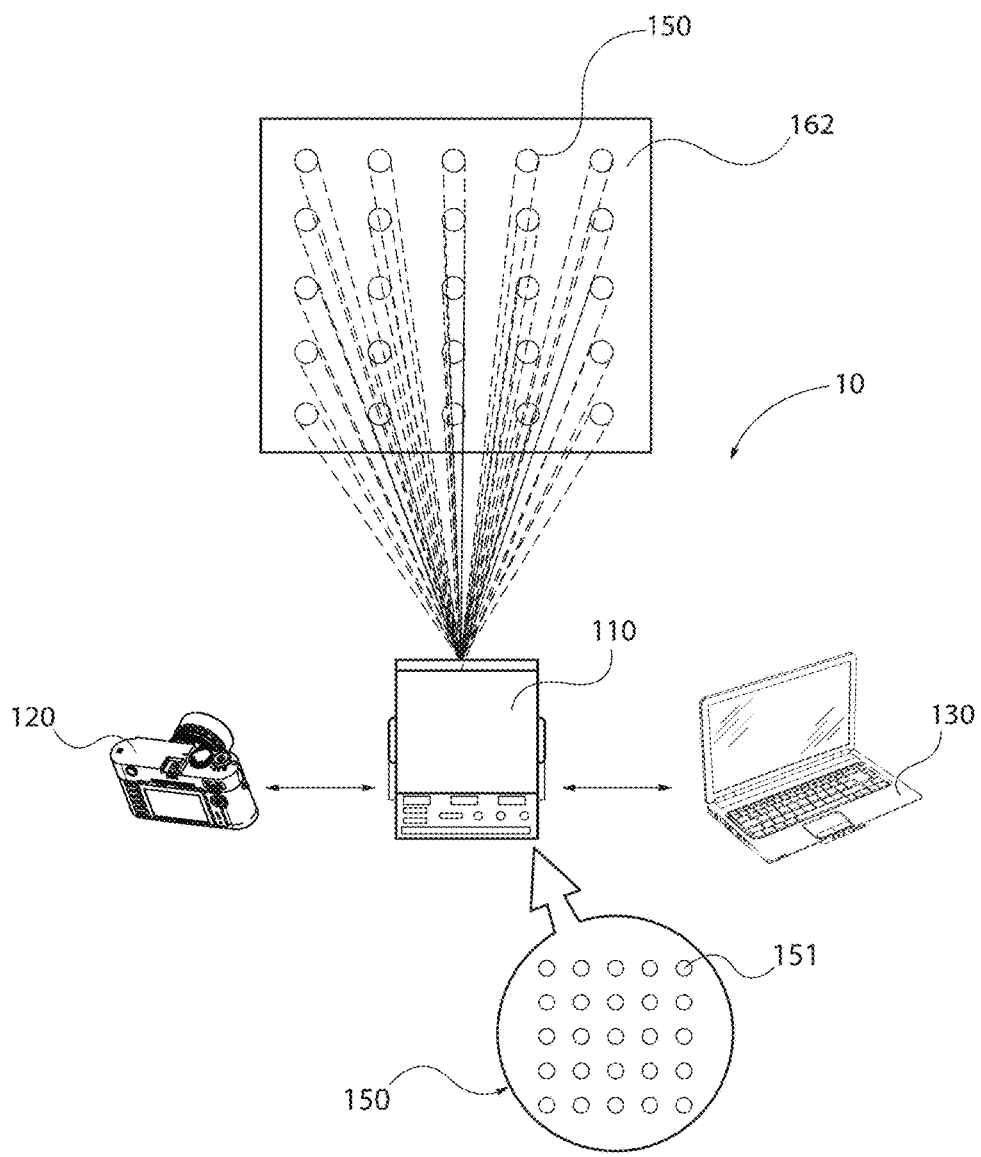
FIG. 1B is a perspective view of the optimization system of FIG. 1A including a calibration arrangement.
Figure 2:
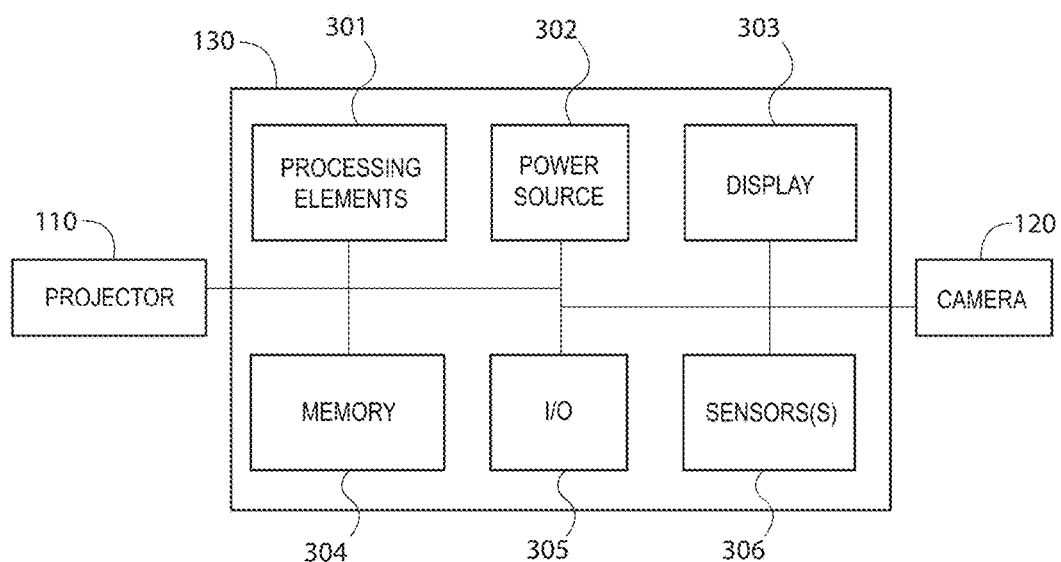
FIG. 2 is a simplified block diagram of the optimization system.

FIG. 1A is a perspective view of optimization system 10. FIG. 1B is a perspective view of a calibration system for FIG. 1A. FIG. 2 is a simplified block diagram of the optimization system 10. With reference to FIGS. 1A-2, the optimization system 10 includes one or more laser projectors 110 for projecting content 153, a projection surface 162, one or more cameras 120, and one or more computers 130. The one or more laser projectors 110, cameras 120, and computers 130 may all be in communication with one another and include the ability to share and transport information between each device. Original content 149 is input to the computer 130 which optimizes a projector path for the projector 110, which then projects the optimized content 153. Each of the components will be discussed in turn below.

The projection surface 162 is any type of opaque surface or object. For example, the projection surface 162 may be flat, non-planar or varying and may include one or more textures or surface variations, and/or colors. In some instances, the projection surface 162 may include multiple surfaces at different depths or locations relative to one another. The type and structure of the projection surface 162 may be varied as desired.

The camera 120 is any device capable of capturing still or video images. The camera 120 captures full color images and/or monochromatic images, and may use any type of filter such as one or more color filters. In one embodiment, the camera 120 is configured to capture substantially the entire dynamic range of the laser projector 110 without severe clipping. The camera 120 is registered or otherwise placed in a known position with their environment, such that the specific orientation and location of the camera 120 relative to the projection surface 162 is known.

It should be noted that although one camera 120 is shown in FIGS. 1A and 1B, in other embodiments, additional cameras may be used. For example, in some embodiments, two cameras can be used for a three-dimensional (3D) calibration of the projector and a single camera can be used for optimization of the projector. Alternatively or additionally, one or more cameras capable of depth perception may be used, such as a 3D stereoscopic camera, KINECT-type depth camera, 3D cameras, machine vision cameras, or any other type of active or passive depth-detection camera, such as time of flight based 3D cameras or infrared 3D cameras.

With reference to FIGS. 1A and 2, the optimization system 10 also includes the computer 130. The computer 130 analyzes data from both the projectors 110 and the camera 120, and also may optionally control one or more functions of either device. In the example of FIG. 1A, only one computer 130 is shown; however, in other embodiments, more than one computer or server may be used. The computer 130 may include one or more processing elements 301, a power source 302, a display 303, one or more memory components 304, and an input/output (I/O) interface 305. Each of the elements of the computer 130 may be in communication via one or more system buses, wirelessly, or the like.

The processing element 301 is any type of electronic device capable of processing, receiving, and/or transmitting instructions. For example, the processing element 301 may be a microprocessor or microcontroller. Additionally, it should be noted that select components of the computer 130 may be controlled by a first processor and other components may be controlled by a second processor, where the first and second processors may or may not be in communication with each other.

The memory 304 stores data used by the computer 130 to store instructions for the processing element 301, as well as store presentation, optimization, calibration, and/or projector model data for the optimization system 10. For example, the memory 304 may store data or content, such as, but not limited to, audio files, video files, and so on, corresponding to various applications. The memory 304 may be, for example, magneto-optical storage, read only memory, random access memory, erasable programmable memory, flash memory, or a combination of one or more types of memory components.

A power source 302 provides power to the components of the computer 130 and may be a battery, power cord, or other element configured to transmit power to the components of the laser projector 110.

The display 303 provides visual feedback to a user and, optionally, can act as an input element to enable a user to control, manipulate, and calibrate various components of the optimization system 10. The display 303 may be any suitable display, such as a liquid crystal display, plasma display, organic light emitting diode display, and/or cathode ray tube display. In embodiments where the display 303 is used as an input, the display may include one or more touch or input sensors, such as capacitive touch sensors, resistive grid, or the like.

The I/O interface 305 provides communication to and from the laser projector 110, camera 120, and the computer 130, as well as other devices (e.g., other computers, auxiliary scene lighting, speakers, etc.). The I/O interface 305 can include one or more input buttons, a communication interface, such as WiFi, Ethernet, or the like, as well as other communication components, such as universal serial bus (USB) cables, or the like.

Optionally, the computer 130 may have sensors 306. The sensors 306 include substantially any device capable of sensing a change in a characteristic or parameter and producing an electrical signal. The sensors 306 may be used in conjunction with, or in place of, the camera 120 or may be used to sense other parameters such as ambient lighting surrounding the projection surface 162. The sensors 306 and display 303 of the computer 130 can be varied as desired to meet the needs of a particular application.

Figure 3:
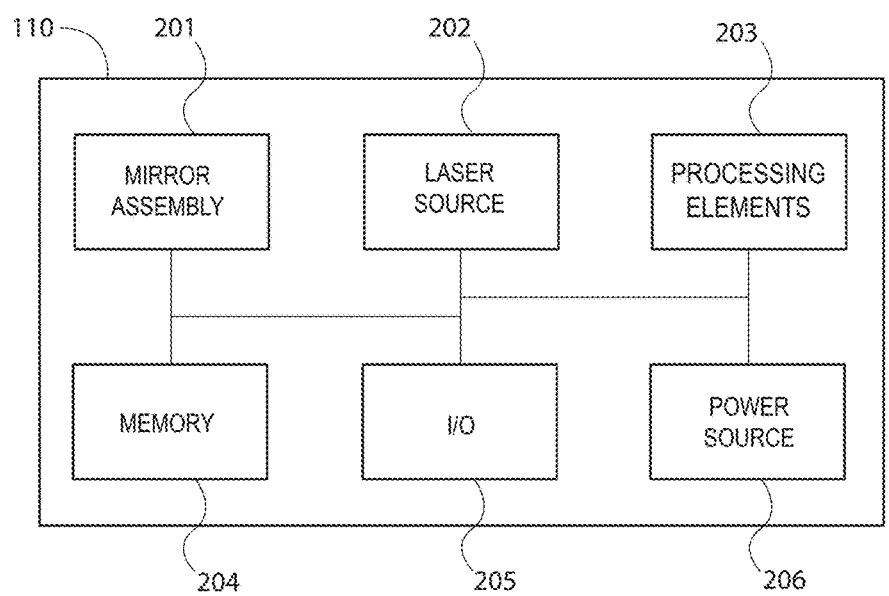
FIG. 3 is a simplified block diagram of a projector of the optimization system.

The laser projector 110 of the optimization system 10 will now be discussed in more detail. FIG. 3 is a simplified block diagram of the laser projector 110. With reference to FIGS. 1 and 3, the laser projector 110 is used to content 153, such as light patterns, images, or the like, onto the projection surface 162 of the scene 160. The laser projector 110 may be a scanning laser projector or other lens or non-lens based projection component. It should be noted that although the embodiments discussed herein are discussed with respect to a laser projector, the optimization method and system may be used with substantially any type of projector, especially those that include moving elements for outputting content.

In some embodiments, the laser projector 110 projects red, green, and/or blue coherent light. In other embodiments the laser projector 110 projects substantially any other color or frequency of light, including visible or invisible light (e.g.

ultraviolet, infrared, and others), as necessary. The laser projector 110 may be a galvanoscopic scanning laser projector, or the like, and include a mirror assembly 201, a laser source 202, one or more processing elements 203, one or more memory components 204, an I/O interface 205, and a power source 206. In some embodiments, the computer 130 may provide some of or all of the processing and storage functions for the projector 110, and, in these embodiments, one or more features of the projector 110 may be omitted.

The mirror assembly 201 directs light emitted by the laser source 202 onto the projection surface 162. In some embodiments, the mirror assembly 201 may include two or more mirrors connected to a galvanoscope servos, or other motion inducing elements. In one embodiment, the mirrors of the mirror assembly 201 may be oriented orthogonally relative to one another, such that one mirror rotates around a first axis and the other mirror rotates around a second axis orthogonal to the first axis. The motion inducing elements move the mirrors, based on an input to the projector 110, to change the output and location of light emitted from the projector 110.

The one or more projector processing elements 203 receive input image data from memory components 204 or I/O interface 205. The projector processing element 203 may be substantially similar to the processing element 301 and may be any electronic device capable of processing, receiving, and/or transmitting instructions. For example, the projector processing elements 203 may be a microprocessor or microcontroller.

The projector memory 204 stores data used by the laser projector 110 and/or computer 130, and may be volatile or non-volatile memory. The memory 204 may be substantially similar to the memory 304, but, in many embodiments, may require less storage than other components.

The power source 206 provides power to the components of the laser projector. The power source 206 may be a battery, power cord, or other element configured to transmit power to the components of the laser projector.

The laser source 202 may be one or more solid-state laser sources, such as a laser diode, or may be a gas laser source and/or other types of coherent light. In other embodiments, the projector may include a non-coherent light source.

The I/O interface 205 provides communication to and from the laser projector 110 and the computer 130, as well as other devices. The I/O interface 205 can include one or more input buttons, a communication interface, such as WiFi, Ethernet, or the like, as well as other communication components, such as universal serial bus (USB) cables, or the like.

Figure 4:
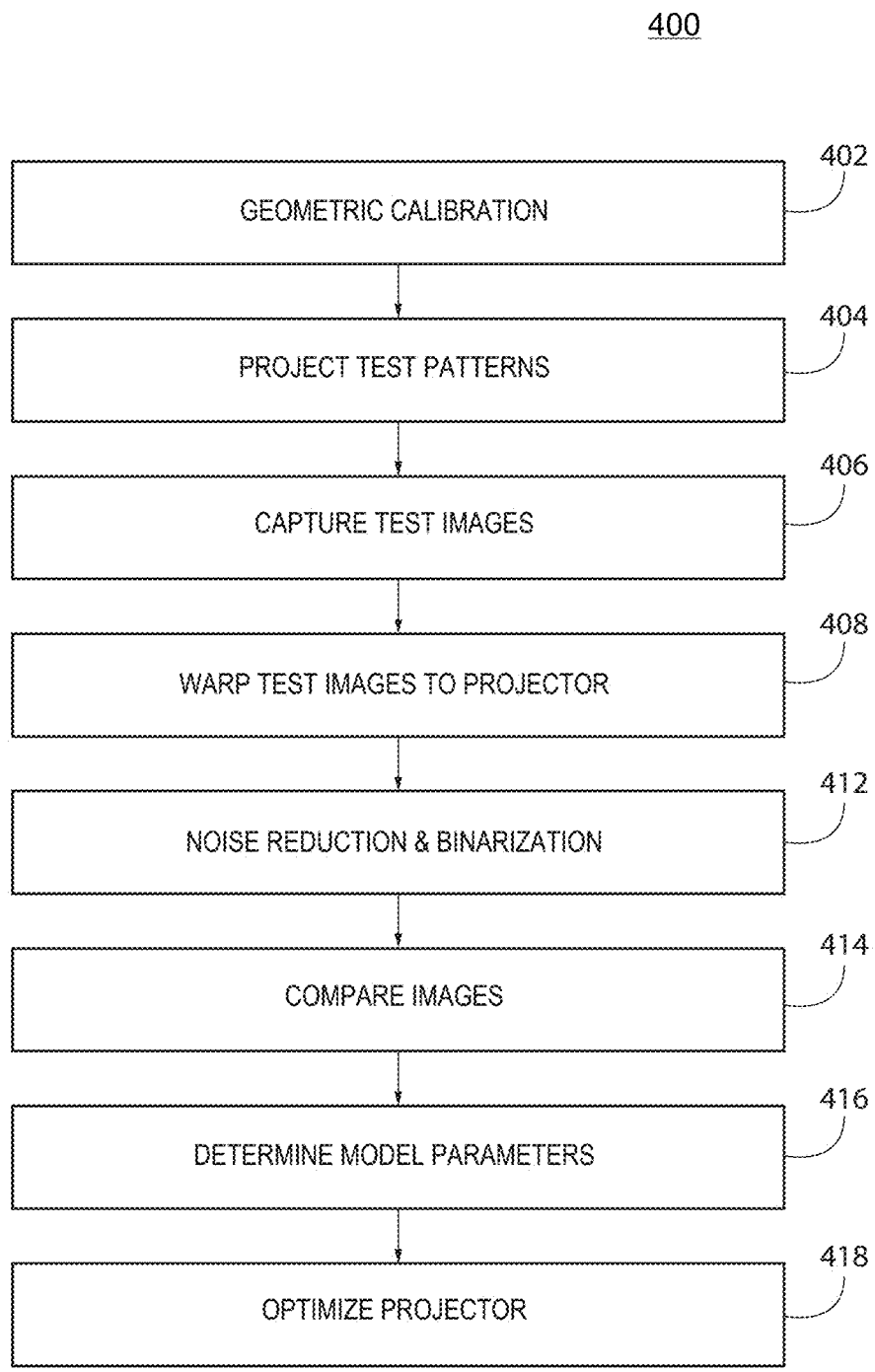
FIG. 4 is a flow chart illustrating an optimization method.

The optimization system 10 is used to calibrate and optimize the laser projector 110 such that the content projected by the projector 110 is projected in the most efficient manner, to reduce flickering and other artifacts. FIG. 4 illustrates a method 400 for optimizing the laser projector 110. The method 400 begins with operation 402 and a geometric calibration is performed. For example, a camera based calibration procedure is used to assess information regarding the scanning behavior of the projector 110 and ensure that the displayed content is projected in a desired spatial location. In this example, the camera 120 pixels are mapped to coordinates of the projected content on the projection surface 162.

Figure 5:
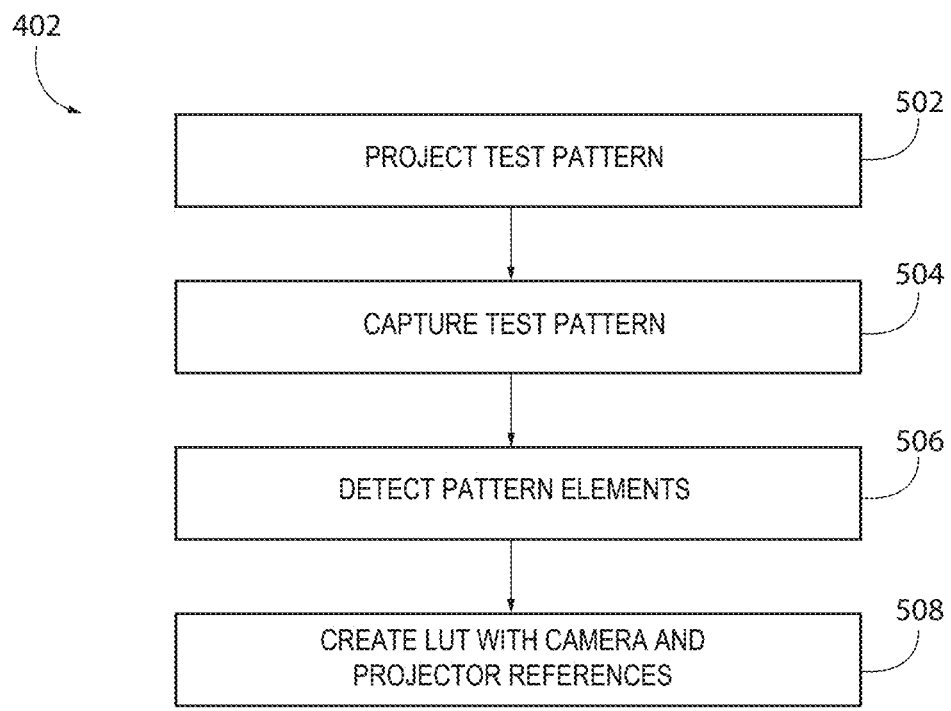
FIG. 5 is a flow chart illustrating a calibration method for the projector and camera of the optimization system.
Figure 7:
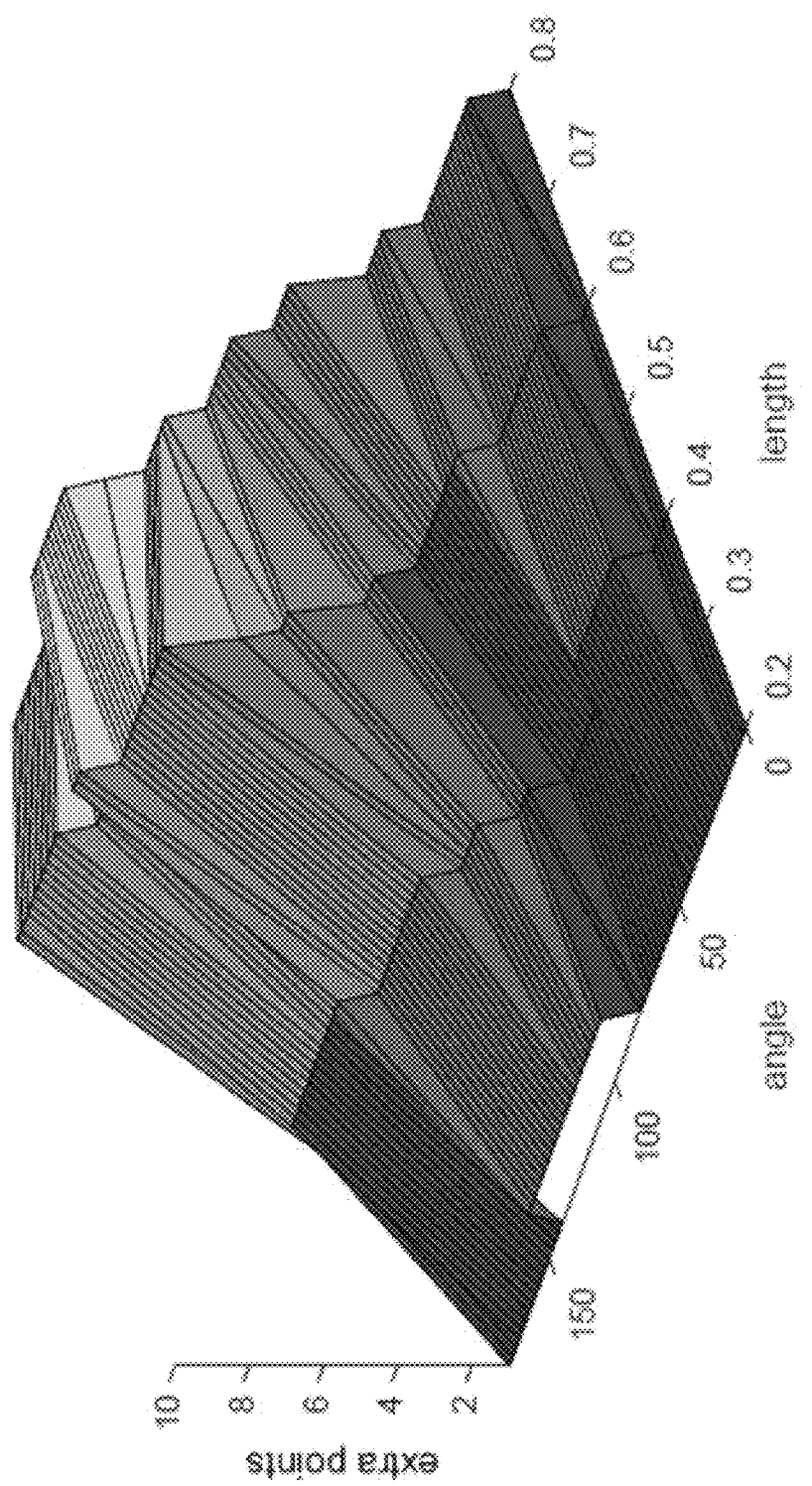
FIG. 7 is an example of model parameters derived for a projector using the method of FIG. 4.

FIG. 5 illustrates an illustrative process of operation 402. With reference FIG. 5, operation 402 includes process 502 and the laser projector 110 projects a calibration pattern 150 onto the projection surface 161. The calibration pattern 150 may be any type of structured light. Examples of calibration patterns can be found in U.S. application Ser. No. 14/534, 855 entitled "Method and System for Projector Calibration," incorporated by reference, in its entirety herein (the '855 Application). The calibration pattern 150 may include a plurality of pattern elements or points that are projected individually or in groups in a temporal binary encoded sequence. For example, in one embodiment, each element 151 of the projected content is identified by the series of on/off occurrences, in other embodiments, the pattern elements 151 may be projected substantially simultaneously.

In some embodiments, portions of a calibration pattern 150 that contains a subset of pattern elements 151 may be projected, whereas remaining portions of the overall calibration pattern 150 having other groups of pattern elements 151 are subsequently projected. In still other embodiments, a calibration pattern 150 having a first set of pattern elements 151 may be projected, followed by another calibration pattern 150 with a second set of pattern elements 151, which may the same or different than the first calibration pattern 150. The second calibration pattern 150 having a second group of pattern elements 151 may be selected or chosen to aid in further refining a feature of the projection surface 161. Further, the second calibration pattern 150 may be chosen based on image feedback provided by the camera 120. That is, calibration of a projector or projection system may be based on projection of more than one calibration pattern 150 in an adaptive manner.

The selection of the arrangement of the elements 151 within the pattern 150 and the projection sequence of the pattern 150 may be determined based on the desired projection surface 162 or content to be projected by the projector.

With reference to FIG. 5, in process 504 the camera 120 captures calibration images of the projected calibration pattern 150. The camera 102 can be adjusted prior to use so that the camera shutters can capture the pattern elements 151 without oversaturating the image sensor photoreceptors. This adjustment can be done automatically or manually by a user (e.g., by adjusting the exposure settings).

Using the camera 120 one or more calibration images are captured. The calibration image is typically a photograph, such as a digital image, that captures the pattern 150 as projected onto the projection surface 162. The calibration image allows the projection elements 151 to be separately identified.

In some embodiments, a plurality of calibration patterns may be projected in a predetermined sequence and one or more calibration images for each calibration pattern may be captured. By using multiple patterns, the processing element may be able to more easily determine the distortion of the laser projector.

Using the calibration images, operation 402 includes process 506 in which the calibration images are analyzed to detect the pattern elements 151. The processing element 301 detects the location of the pattern elements 151 using an image analysis algorithm, such as a blob detection algorithm, or other algorithm that can detect locations of the pattern elements 151.

The image analysis algorithm used for detecting pattern elements 151 is selected based on characteristics of the pattern elements 151. For instance if the pattern elements 151 are dots or blobs, the processing element 301 may use a blob detection algorithm. As one example, the blob detection algorithm may include the steps of subtracting a background from an image and thresholding the image in order to mask suspected blob or feature locations. Executing the algorithm, the processing element then analyzes each masked region to calculate a center of gravity of that blob. In one exemplary embodiment of the present disclosure discussed in more detail below, when the processing element 301 is configured to use a blob detection algorithm to detect pattern elements 151, the processing element 301 analyzes and compares the relative location of the center of gravity for each detected blob to the centers of gravity for other blobs in order to determine the coordinate for the blob within the 2D image plane.

In other embodiments, if the pattern elements 151 are selected to be lines or line segments, a line center detection algorithm may be used. Other algorithms for detecting pattern elements 151 may also or alternatively include feature detection, edge detection, sequential binary coded blobs, binary coded horizontal and/or vertical lines, gray codes with long exposure, color coded patterns, intensity codec patterns, more complex pattern element features, and the like. Depending on the shape of the pattern elements 151, some algorithms may be more accurate than others, while others may require less processing power.

Returning to FIG. 5, once the test pattern has been captured by the camera system 120 and processed by the computer 130, operation 502 includes process 506 in which the pattern elements 151 are detected. For example, the image analysis algorithm reviews the calibration images to detect regions that differ in one or more properties, such as, but not limited to, brightness, color or hue, as compared to surrounding regions. In this example, the pattern elements 151 captured will be brighter and may have a different color than the surrounding areas of the pattern 150, and so allows the processing element to detect their location.

In one example, the processing element analyzes the captured images to determine the location of a center of each pattern element 151 in the two dimensional (2D) image plane of the respective camera 120. That is, the 2D coordinates of each pattern element 151 are determined by using the detectable features of each element 151. In one example, a blob detection algorithm may be used to provide sub-pixel accuracy for the location of the center of a pattern element 151. However, as discussed above, other algorithms may be used as well.

Using the detected elements, the operation 402 proceeds to process 508 and determines the 2D positions of the test pattern elements 151 within the scene 160 and creates a dense lookup table between the camera 120 and the image plane of the projector 110. In other words, a correspondence between the location of the projected pixels and the input into the projector is determined. It should be noted that operation 402 is described with respect to a 2D mapping between the camera 120 and the projector 110. For example, once the mapping is generated between the sub-pixel locations on the image plane of the camera 120 and the projector 110 coordinates using the blob detection (or other algorithm) missing points are interpolated using thin-plate-spline based interpolation to generate a dense look-up table which enables the warping of camera images onto the projector's virtual image plane. Examples of the lookup table generation can be found in the '855 Application. It should be noted that these steps can be carried out in a variety of ways and other interpolation methods can be used to generate the dense map.

In embodiments where a 3D mapping may be desired (e.g., for a non-planar projector surface), two or more cameras can be used as described in the '855 Application. However, for the method of the present application, for simplicity and to reduce errors, a 2D mapping can be used.

Returning to FIG. 4, after the geometric registration of the camera 120 and the projector 110 is complete, the optimization and model generation of the projector can begin.

The method 400 proceeds to operation 404 and test patterns are projected onto the projection surface 160. FIG. 6A illustrates an example of a test pattern 600 projected onto a projection surface 608. In many embodiments, the test pattern 600 includes three points 602, 604, 606 arranged at different angles, distances relative to one another, set with different accelerations and decelerations of the mirrors. In these embodiments, the pattern 600 includes one center point 602 positioned between the other two points. While in some embodiments, two points could be used to assess the behavior of the projector 110, adding a third point provides additional data regarding the angular directional change between the different points.

The parameters of the test patterns 600 are varied between test patterns and multiple test patterns are used to enhance the sensitivity of the optimization. In these examples, a select sequence is used where the first point projected is the top right point 604, the central point 602 is then projected, following with the top left point 606 and in each subsequent test pattern 600 the angle between the points and optionally the distance between the points is changed. While three points are disclosed, in other embodiments, additional points can be used with the "center points" forming each of the points between the first and last projected points sequentially projected in the pattern.

The test patterns 600, including the number of points, angle variation, and distance variation is selected to best detect the acceleration and deceleration of the laser projector 110 as it starts and stops the movement to project each point 602, 604, 606 in the pattern 600 and may be set as "V" shape, but can vary based on the type of projector 110. By varying the points, stopping points, which are typically located at the same or similar position of a projected point, are generally used by laser projectors to assess when to stop or slow down as the mirrors approach the location for the projected point. These stopping points or speed control points are blank or invisible points (e.g., projected in same color as background or not projected at all) slow the laser down and can be used by the projector to decelerate the mirror. These speed control points vary based on the location of the previously projected point.

Represented mathematically, a set of test point patterns P ($\alpha$, $\delta$) with varying angles (0.0°≤$\alpha$≤180.0°) and normalized distances (0.2*d≤$\delta$≤0.8*d) is projected multiple times with an increasing number of stopping points n which denoted as $\{p(\alpha, \delta)_0, \ldots, p(\alpha, \delta)_n\} \in (\alpha, \delta)$. In which d corresponds to half of the height of the virtual image plane and equals $$\frac{\sqrt{0.5}}{2}$$

of the diagonal.

With reference to FIG. 4, as the different test patterns 600 are projected by the projector 110, method 400 proceeds to operation 406 and the camera 120 or measurement sensor captures test images 610 of the projected patterns. FIG. 6B illustrates an example of a test image 610 captured by the camera 120 in FIG. 6A. It should be noted that a single camera 120 is required to capture the test images, but multiple cameras can also be used. In some embodiments, the camera 120 is focused or angled on just the center point as the other points may not be needed in the model generation for the reasons discussed below.

The test images 610 are typically captured using a short shutter time to assist in avoiding the occurrence of saturated intensities. Additionally, to ensure that the laser path is fully captured, multiple images of the same pattern can be taken with random delays of a few milliseconds in between and averaged, which also reduces the amount of noise in the images. In a specific example, eight test images 610 are captured for each test pattern 600. Typically, the shutter speed of the camera 120 is selected to be sufficiently slow to capture the entire pattern (e.g., all three points 602, 604, 606) at once. However, in other embodiments the camera shutter speed may be increased to capture only one or two of the points.

Additionally, in embodiments where the pattern is drawn repeatedly, some points may be brighter than others. Averaging multiple images of the same pattern with random delays helps to ensure that all points approximately share the same overall brightness at the end and are typically unaffected by the scanning speed and shutter time of the camera 120.

Using the test images 610 captured in operation 406, the method 400 proceeds to operation 408 and the processing element removes noise and otherwise prepares the test images 610 to be analyzed. Specifically, the test images 610 are warped to the virtual image plane of the projector 110 so that the images can be more accurately compared to the expected projected content. Operation 408 is completed by using the lookup table generated in operation 402 such that the processing element 310 compares the test images 610 to rasterized representations of the test pattern data 600 and modifies the test images to represent the images from the view of the image plane of the projector.

In one embodiment, the series of test images 610 is represented by $\{c(\alpha, \delta)_0, \ldots, c(\alpha, \delta)_n\} \in C(\alpha, \delta)$ and the members of $C(\alpha, \delta)$ are warped onto the virtual image plane of the projector 110 using the dense 2D warping lookup table generated in operation 402 to get $C^*(\alpha, \delta)$. This allows the processing element to compare the test images 610 to the rasterized representations of the test pattern 600 data $R(\alpha, \delta)$.

In some embodiments, the test images 610 may be cropped to focus on a desired point. For example, in some embodiments the central point 202 is analyzed and the test images 610 are cropped to a small region around the central point 202. As can be appreciated below, the central point (or groups of center points) may be the only one that needs to be analyzed to determine the projector behavior. For example, the central point is the location that demonstrates the angularity changes between the first point and the last point. The number of stopping points or speed control points typically only changes at the center point. In other words, although the first and last points are needed to project the pattern, only the central point needs to be analyzed to determine the variations in the angularity, distance, and stopping points (acceleration and deceleration) that occur with changes in the pattern. It should be noted that in instances where more than three points are used for the pattern, the central point evaluated could include multiple points, such as all of those points falling between the first projected point in the pattern and the last projected point in the pattern.

An example of a cropped image is shown in FIG. 6C. The cropped image 612 of $R(\alpha, \delta)$ results in a single white pixel at the image center corresponding to the central point 602. The central point 602 will be the same for all $\alpha$, $\delta$ it can be denoted as R. The other points may be used as well, with corresponding changes to the model inputs.

After warping the images to the projector and optionally cropping the images, the method 400 proceeds to operation 412 and a noise reduction and binarization is applied. For example, any method that can robustly separate and detect the point in the images can be used. As a specific example, intensity thresholding can be used to remove outlier pixels and intensities. In one embodiment, an intensity thresholding is applied to $C^*(\alpha, \delta)$ where a brightness threshold is defined. Typically, the surface illumination (and as a consequence the intensity of the captured images 610) varies primarily on the number of added stopping points. Thus, an adaptive thresholding method in combination with a fixed low intensity threshold method can be used to segment all patterns automatically. Operation 412 produces binary images for all n stopping points of the test pattern 600, all angles, and all distances for each test image 610. It should be noted that in many instances a test image 610 with three or five stopping points may generally look the same because the same central point is illuminated, but in a pattern with more stopping points, the central point will be brighter. A new binary image for each combination of stopping points, angles, and distances may be generated.

With reference to FIG. 4, once the images have been processed in operation 412, the method 400 proceeds to operation 414 and the central point 602 in each of the test images 610 is compared (R). Expressed mathematically, the resulting binary images for all n added stopping points $\{t(\alpha, \delta)_0, \ldots, t(\alpha, \delta)_n\} \in T(\alpha, \delta)$ are compared to R.

In a specific embodiment, each of the binary test images 610 (analyzed for noise and optionally cropped) are compared to R using two error metrics: hit error and distance error. Hit error is represented by Equation (1) and describes whether the desired point location of the pattern was illuminated by the projector 110. Distance error is represented by Equation (2) describes how far the drawn pixel is within a predetermined area (e.g., a rectangular area within the image) and may be determined by the number of pixels away from the center of the rectangle. In Equation (2), dist is the L2 distance transform.

$$\Delta_{hit} = \neg (R \cap T(\alpha,\delta)) \qquad (1)$$

$$\Delta_{dist} = \Sigma_{\forall pixel} \text{dist}(R) * T(\alpha,\delta) \qquad (2)$$

It should be noted that in some embodiments, the pattern could be analyzed using an edge point rather than the central point. In these embodiments, the model and error calculations should be modified based on the varying spatial location.

Using the calculations performed in operation 414, the method 400 proceeds to operation 416. In operation 416, the processing element 301 determines the optimal model parameters using Equation (3) below. In on embodiment, only those $\Delta_{dist}$ where $\Delta_{hit}=0$ are used in the calculations because when $\Delta_{hit} \neq 0$ the desired spatial accuracy cannot be achieved with the current number of stopping points for this configuration of $\alpha$ and $\delta$. Thus, the overall error term for each specific combination of n, $\alpha$ and $\delta$ is defined by Equation (3):

$$e(\alpha, \delta) = \begin{cases} \Delta_{dist}, & \text{if } \Delta_{hit} = 0 \\ \infty, & \text{otherwise} \end{cases} \qquad (3)$$

Where $\Delta_{dist}$ should be minimized to draw the desired point as accurately as possible.

Once the processing element analyzes the patterns 600 of each image with various stopping points n for all α and δ, a model database describing the displaying behavior of the laser projector 110 is defined using the following relationships. The optimal number of stopping points for α and δ is declared as N(α, δ) and the corresponding error as E(α, δ). The model database entry of N(α, δ) is initialized with zero stopping points N(α, δ)=0 and accordingly their initial error values E(α, δ)=e(α, δ)$_0$. The number of stopping points i∈[0, n] gets iteratively increased by one and their error values e(α, δ)$_i$ evaluated and compared to E(α, δ). The optimal number of error points N(α, δ) gets increased by one if there is an i for which e(α, δ)$_i$<E(α, δ)*t, t∈(0,1]. In one example, t was set to t=0.75. The analysis then continues with i=N(α, δ)+1.

Figure 8:
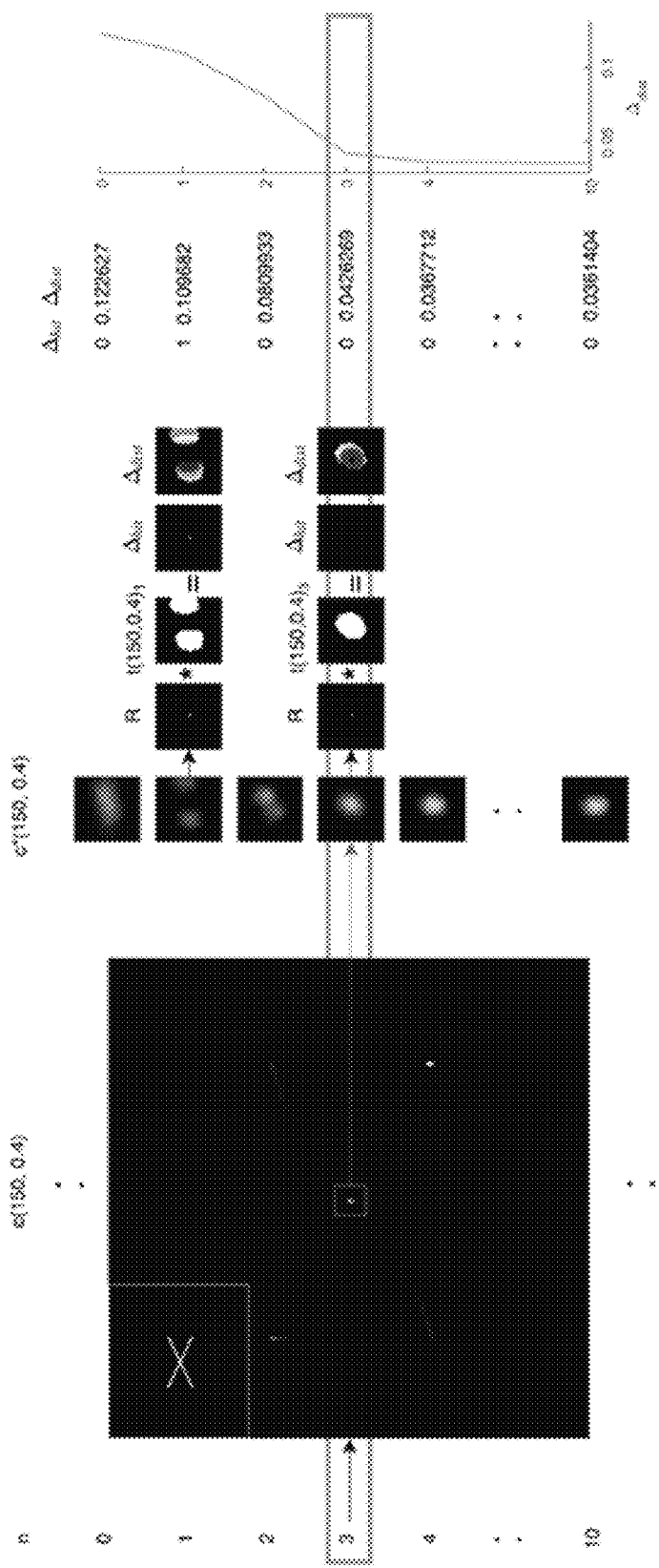
FIG. 8 is a diagram illustrating select operations of the method of FIG. 4.

Operations 410 through 416 are shown in FIG. 8 which illustrates a test image 610 cropped, compared, and the resulting optimal number of points that are selected. With reference to FIG. 8, the analysis workflow of the hit and distance error calculations for three points (n=3, α=150, and δ=0.4). As shown in FIG. 8, the test image 610 is warped from the camera image plane to the projector's virtual image plane and cropped to a region around the central point. Then, adaptive thresholding is applied and the errors $\Delta_{hit}$ and $\Delta_{dist}$ are calculated.

It should be noted that both the distance and hit errors might be sensitive to noise in the input data. In these instances two additional post-processing steps can be applied to reduce error. First, for consecutive angles $\alpha_j$, $\alpha_{j+1}$ at a fixed distance $\delta_k$ the model is restricted to have less stopping points N($\alpha_{j+1}$, $\delta_k$)<N($\alpha_j$, $\delta_k$) only if the corresponding error also decreases E($\alpha_{j+1}$, $\delta_k$)<E($\alpha_j$, $\delta_k$). Otherwise N($\alpha_{j+1}$, $\delta_k$) is set to N($\alpha_j$, $\delta_k$). Second, an outlier removal procedure can be applied to remove single outliers between consecutive angles of the same distance. In some embodiments, optionally, methods to smooth out and reduce the errors of the model can be done. For example, if a whole sequence of consecutive angles has non-monotonic changes, all corresponding N(α, δ) get assigned to the maximum number of stopping points within this sequence. FIG. 8 illustrates a visualization of the result of the measured database entries of N for one type of laser projector 110. As shown in FIG. 8, the derived model parameters depend on the length (normalized distance) from the consecutive point, as well as the angle relative to the consecutive point. In this example, as the angle between points increases, more stopping points are required in order for the content to be more accurate.

Once the model parameters are determined, the method 400 proceeds to operation 418 and the projector 110 is optimized for select content. To do this, the input content (i.e., the content to be projected) is input into the model. For example, the memory of the computer can store the model or the model database and using the process outlined below assess the model to solve for a minimized total path length for the content and the optimal angularity that the path is traversed that requires the least amount of stopping points.

As noted above, the speed and spatial precision of content projected by the laser projector 110 typically depends on factors that are influenced by the physical movement of the galvanoscopic mirrors. Examples of these factors include: inertia, resonant vibrations, and acceleration and deceleration to display individual points at a desired location. In instances where the mirrors cannot be controlled directly (e.g., through an off the shelf laser projector), the optimization controls global parameters such as overall scanning speed, number of stopping points, angle between consecutive points, distance between consecutive points, and number of stopping points, to improve the speed and spatial precision of the projector 110.

The optimization generates a point sequence path where the overall scanning time is minimized but that the content will still be displayed accurately at the desired locations. Further, temporal sequences (multiple frame content) should be projected such that the spatio-temporal point distribution is homogenously distributed as much as possible to evenly distribute and further suppress perceived flickering.

Additionally, in many instances, a globally optimized scanning path for a random input point sequence is an NP-complete problem and cannot be easily solved within a short period of time. Accordingly, the below optimization is selected to find an approximate solution that is sufficiently close to the global optimum to achieve a desired performance. However, in instances where more time is provided, the optimized path can be solved completely.

The projector 110 can be analyzed for both still frame content and two or more moving or sequential frames of content. Still frame optimization minimizes error costs of distance and angle, whereas sequential frames include the additional temporal cost.

Still frame optimization is used to minimize the total path length of the projector 110 in projecting each of the points, while reducing the time for projecting the points by considering the optimal angularity. For example, to optimize a scanning path of a single still frame containing l points {p$_0$, . . . , p$_{l-1}$}∈P the processing element 301 utilizes the equation (4) below to minimize the error costs.

Distance cost which is defined by:

$$\varepsilon_\delta = \sum_{i=0}^{l-1} \Gamma(p_i) \qquad (4)$$

with $$\Gamma(p_i) = |p_{i-1}(x,y) - p_i(x,y)| \qquad (5)$$

To make the distance cost independent of the resolution of the virtual image plane the maximal possible distance over the diagonal is normalized to 1.0.

Angle cost which is defined by:

$$\varepsilon_\alpha = \sum_{i=0}^{l-1} \Theta(\Gamma(p_i), \Gamma(p_i), N) \qquad (6)$$

In Equation (6) Γ(p$_i$) is the angle at point p$_i$ formed by the path p$_{i-1}$→p$_i$→p$_{i+1}$ and Θ(Γ(i), Γ(p$_i$), N) is the look up to the nearest entry in the model database N storing the required number of stopping points. The total cost is given by the weighted sum of the two terms in Equation (7):

$$\varepsilon = \varepsilon_\delta * \omega_\delta + \varepsilon_\alpha * \omega_\alpha \qquad (7)$$

The optimal values for $\omega_\delta$ and $\omega_\alpha$ were estimated as described above. This error is minimized using a k-opt method. In particular, a 2-opt is applied to the input randomized path and starts as long as there are path improvements. To further improve the solution, a 3-opt can be applied afterwards. Since the k-opt optimization depends on the start configuration of the path, optionally it is possible to start the described procedure several times with different start configurations and select the best solution. Other solvers, such as Particle Swarm optimization, Lin-Kernighan-Helsgaun heuristic, minimum spanning tree heuristic, simulated annealing, Tabu search, or Christofides heuristic can also be used.

In instances where the projected content includes two or more frames of content are projected the optimization takes the spatial distribution across frames into account. For example, if the content is an animated point sequence of S frames, the optimization additionally equalizes the spatiotemporal distribution of points in consecutive frames of the animation. This helps to ensure that spatially located points in proximity are drawn within approximately equal temporal offsets to ensure an equal light distribution over the whole frame to reduce the perception of locally varying flickering. For example, any flickering that cannot be controlled (such as due to inherent physical characteristics) will be distributed across each frame equally and across multiple frames so as to be less apparent.

In particular, the still frame optimization is extended to consider spatio-temporal consistency. Solution $\Omega_s$ of frame $f_s$ at position $s \in [0, S-1]$ is initialized with a nearest neighbor (NN) approach to the previous solution $\Omega_{s-1}$. In one embodiment, the NN approach uses a kd-tree applying the flann method and for every point in $f_s$ the order position of the NN in $\Omega_{s-1}$ is determined and normalize that position by the number of points $l_{s-1}$ in $\Omega_{s-1}$. It should be noted that the number of points l in each frame can be arbitrary. Depending on speed constraints, other types of nearest neighbor search methods could be used. Using the relative order position (Π), the point is mapped to the corresponding absolute order position for $f_s$. After the NN is found, these are sorted such that paths with those points that are closest to the beginning of the optimal path in the previous solution. With this method, the spatio-temporal error cost is defined by Equation (8) below.

$$\varepsilon_\theta = \Sigma_{i=0}^{l_s-1} |\Pi_s(p_i) - \Pi_{s-1}(NN_{s-1}(p_i))| \quad (8)$$

The overall error term for the temporal optimization is then defined as an extension of equation (9):

$$\varepsilon = \varepsilon_\alpha * \omega_\alpha + \varepsilon_\delta * \omega_\delta + \varepsilon_\theta * \omega_\theta \quad (9)$$

In one embodiment, the temporal weighting factor $\omega_\theta$ is set to 10, while $\omega_\delta$ and $\omega_\alpha$ were optimally set to 100 and 1. However, other weighting factors can be used and may vary based on the specific projector being optimized. Alternatively, the camera could be used to generate the weighting estimations. As a note, in Equations 4, 6 and 8 for the case that index i goes out of bounds it is mapped back to the indices space in a circular manner.

Figure 9:
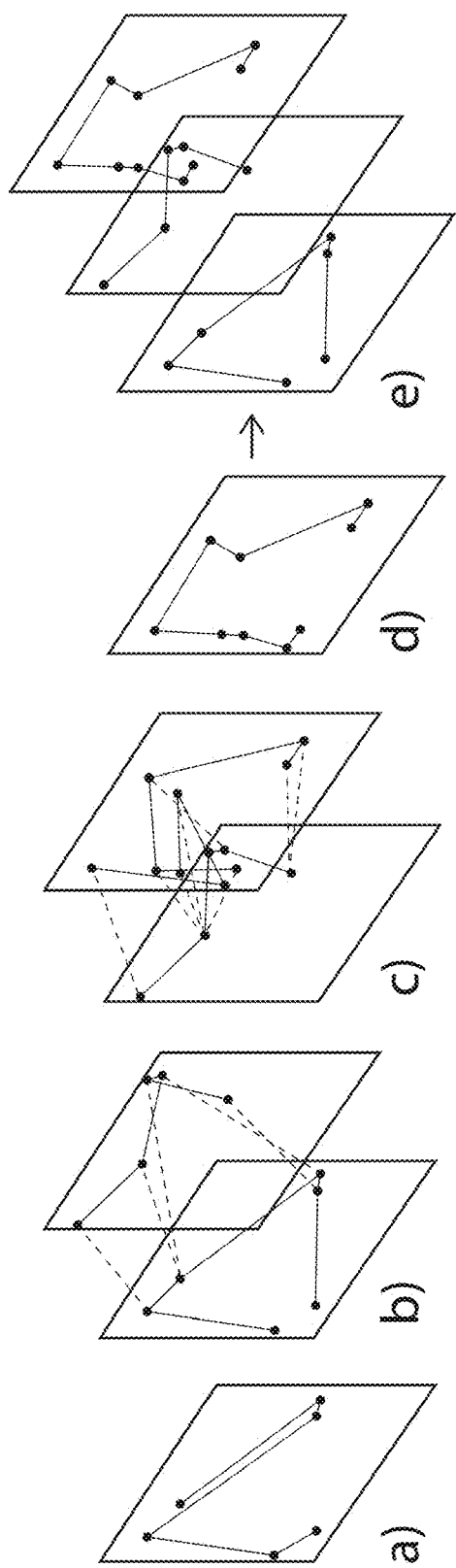
FIG. 9 is a schematic representation of the optimization operation of FIG. 4.

FIG. 9 is a schematic representation of the optimization. With reference to FIG. 9, in this example, (a) illustrates the optimization of the random path traversal of the first frame sequence by distance and angularity using the derived model parameters (b). In the next frame, all the points are mapped to the closest points of the optimized previous frame and an initial path is generated. This path serves as a starting point to optimize the frame using the additional temporal error cost (c). This same procedure is repeated for the next and each consecutive frame of the sequence (d) to get the spatiotemporal paths minimizing scanning time and flickering (e).

Figure 10B:
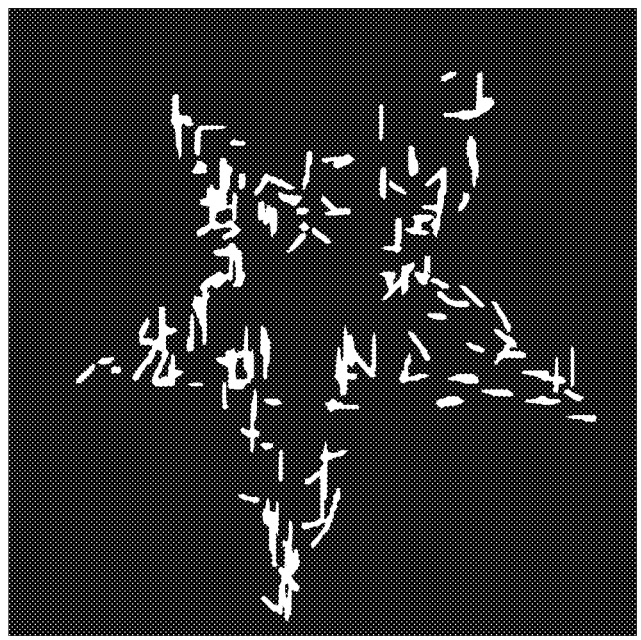
FIG. 10B illustrates the frame of content in FIG. 10A after optimization.
Figure 10A:
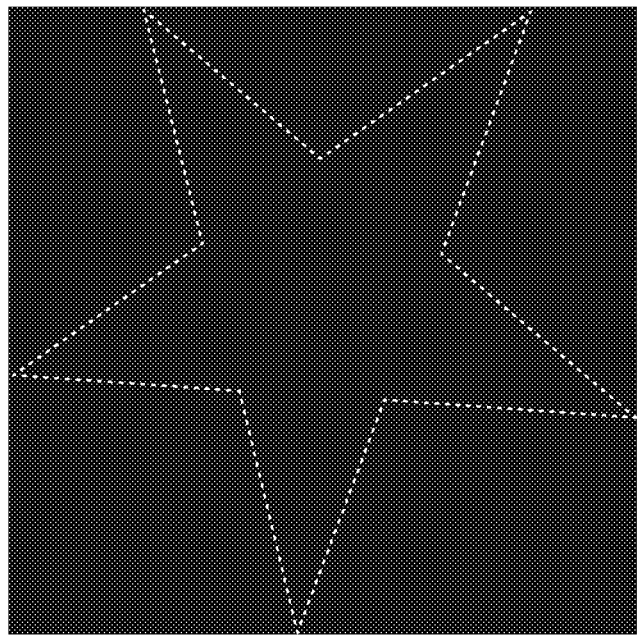
FIG. 10A illustrates a frame of content projected by the projector before optimization.

FIG. 10A illustrates a frame of content projected by the projector 110 before optimization. As shown in FIG. 10A, when the content is displayed in random order without stopping points, the spatial locations for the content (e.g., the lines and vertices of the star design) are not exactly hit and the points are rendered as strokes. However, using the optimization method 400 the projector 110 is optimized and the content is rendered as desired by adding a number of stopping points and optimal drawing order. In short, by applying a global optimization for point clouds of the content, as well as considering temporal effects, the method of the present disclosure can substantially enhance the spatial alignment of rendered points, the aesthetics of the rendering (e.g., dots versus dashes when desired), as well reduce the overall scanning speed of the projector 110, decreasing flickering and other artifacts.

The above specification, examples, and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as only illustrative of particular embodiments and not limiting. Changes in detail or structure may be made without departing from the basic elements of the invention as defined in the following claims.

What is claimed is:

1. A method for optimizing a projector for displaying content, comprising:
   receiving by a processing element a plurality of test images corresponding to two or more test patterns projected by the projector on a projection surface, wherein each of the test patterns comprises at least two points;
   comparing by the processing element the plurality of test images to assess one or more projector characteristics related to a distance between the two points;
   generating by the processing element a projector model representing the one or more projector characteristics; and
   utilizing the model to determine a projection path of light corresponding to pixels of the content as projected by the projector on the projection surface.

2. The method of claim 1, wherein each of the test patterns further comprises at least three points.

3. The method of claim 2, wherein comparing by the processing element the plurality of test images comprises comparing a central point within the test pattern in each of the test images.

4. The method of claim 3, wherein the central point comprises multiple points that are projected sequentially between a first projected point and a last projected point.

5. The method of claim 3, wherein comparing by the processing element the plurality of test images comprises:
   determining whether the central point was illuminated by the projector; and
   determining a distance of the central point in the test image relative to a desired location of the central point in the test pattern.

6. The method of claim 1, wherein the processing element further assesses the projector characteristics related to an angle between consecutive points in the test pattern.

7. The method of claim 1, wherein the processing element further assesses the one or more projector characteristics related to a number of stopping points by the projector between consecutive points in the test pattern.

8. The method of claim 1, further comprising projecting by the projector the content.

9. The method of claim 1, wherein the projector is a laser scanning projector.

10. A method for generating a projector model of a projector for optimizing a projection path of content, the method comprising:
    capturing by a camera multiple pattern images of test patterns projected by the projector;

analyzing the pattern images to determine a distance characteristic and an angularity characteristic for each test pattern as captured in each of the pattern images;

creating a model database representing the projector based on the distance characteristic and angularity characteristic of each test pattern; and utilizing the model database to optimize the projection path of light corresponding to the content emitted by the projector on a projection surface.

11. The method of claim 10, further comprising comparing each pattern image against the test pattern input to the projector based on whether at least one point was illuminated at a desired location.

12. The method of claim 11, further comprising analyzing each pattern image against the test pattern input to the projector to determine a distance between a point in the pattern image and a point in the test pattern.

13. The method of claim 10, further comprising selecting a region around a central point of the test pattern represented in the pattern images.

14. The method of claim 10, wherein each test pattern comprises a first point, a second point, and a third point, wherein the first point is projected first, the second point is projected second, and the third point is projected third.

15. The method of claim 10, further comprising geometrically calibrating the camera and the projector to determine a dense correspondence between an image plane of the camera and an image plane of the projector.

16. The method of claim 10, wherein the projector is a laser scanning projector.

17. A system for optimizing a projection path for projection of content, comprising:

a laser projector for projecting the content; and a computer electronically connected to the laser projector, the computer comprising memory including a projector model database corresponding to a displaying behavior of the projector, wherein the computer is configured analyze the projector model to:

determine a minimized length of the projection path of light on the projection surface for the content; and determine an optimal angularity between each point of the content along the projection path.

18. The system of claim 17, wherein the content comprises a first frame and a second frame and the computer is further configured to analyze the projector model to equalize a spatio-temporal distribution of a plurality of points of the content in the first frame and the second frame.

19. The system of claim 18, wherein the content comprises a third frame and a fourth frame and the computer is further configured to analyze the projector model to equalize a spatio-temporal distribution of a plurality of points of the content in the first frame, the second frame, the third frame, and the fourth frame.

* * * * *